United States Patent [19]
Lee

[11] Patent Number: 5,783,070
[45] Date of Patent: Jul. 21, 1998

[54] POLLUTANT TRAY FOR AQUARIUM

[76] Inventor: Chih-Hsiang Lee, 5F-7, No. 63, Sec. 2, Chang-An E. Rd., Taipei, Taiwan, China

[21] Appl. No.: 778,745

[22] Filed: Jan. 4, 1997

[51] Int. Cl.⁶ ................................. A01K 63/04
[52] U.S. Cl. .................. 210/169; 119/264; 210/232; 210/416.2
[58] Field of Search ............... 210/169, 232, 210/416.2; 119/259, 264

[56] References Cited

U.S. PATENT DOCUMENTS

| | | | |
|---|---|---|---|
| 2,935,199 | 5/1960 | Willinger | 210/169 |
| 3,118,774 | 1/1964 | Arak | 210/169 |
| 3,516,544 | 6/1970 | Sesholtz | 210/169 |
| 3,827,560 | 8/1974 | Morton | 210/169 |
| 4,035,298 | 7/1977 | Cloke et al. | 210/169 |
| 4,556,485 | 12/1985 | Ogawa | 210/169 |
| 4,752,388 | 6/1988 | Ng | 210/169 |
| 4,913,811 | 4/1990 | Huang et al. | 210/169 |
| 4,957,623 | 9/1990 | Henzlik | 210/169 |
| 5,667,672 | 9/1997 | Convertino et al. | 210/169 |

*Primary Examiner*—Peter A. Hruskoci
*Assistant Examiner*—Betsey J. Morrison
*Attorney, Agent, or Firm*—Bacon & Thomas

[57] ABSTRACT

An improved pollutant tray structure for an aquarium, which comprises a pollutant tray and a filter cover; the pollutant tray includes a given number of such trays connected together in series; the pollutant tray and the water passage are molded integrally into one piece; the water passage is mounted with a water pipe connector having a built-in removable lamina; a water pipe is used for connecting to a water pump. Both sides of the water passage are furnished with a plurality of water channels respectively; each water channel includes three sloping surfaces to be concentrated to a water-intake hole in communication with the water passage; when the water pump sucks water from the water passage, such suction force will be distributed to the various water-intake holes to suck the decomposed waste substance fallen in a space between the water passage and the water channels.

11 Claims, 7 Drawing Sheets

POLLUTANT TRAY FOR AQUARIUM

BACKGROUND OF THE INVENTION

1. Field of the Invention

This invention relates to a pollutant tray for an aquarium, and particularly to a pollutant tray which can evenly pump the decomposed waste substance dropped into the water channels.

2. Description of the Prior Art

In the conventional pollutant trays of an aquarium, such as a Taiwan Application No. 77211953, each of the pollutant trays is furnished with a suitable sloping surface; all such sloping surfaces are directed to one common water-intake hole; the water-intake hole extends to a space under the pollutant tray. Under the pollutant tray, there is a water-pipe positioning plate to facilitate the water pipe to be mounted in place under the pollutant tray. The water pipes are connected with a water pump so as to suck the decomposed waste substance fallen on the pollutant tray. Such a pollutant tray commercialized can be used for collecting the decomposed waste substance; however, the sloping angle of the surface outside the water-intake hole is not high, and the decomposed waste substance fallen can not be exhausted quickly.

A conventional pollutant tray, such as disclosed in U.S. Pat. No. 4,807,565, includes a funnelform bottom provided with a plurality of sloping surfaces, a collecting drain, and a hole in the center of the collecting drain; the bottom surface of the collecting drain is covered with a net member for collecting the decomposed waste substance in the collecting drain. A circulation pump is mounted under the water-intake hole so as to pump water to an upper water tank for later circulation.

SUMMARY OF THE INVENTION

The primary object of the present invention is to provide a pollutant tray structure for collecting and pumping the decomposed waste substance fallen on the pollutant tray quickly and effectively.

Another object of the present invention is to provide a pollutant tray for aquarium, in which a water passage is furnished under the water pipe connector of the pollutant tray; the water passage and the pollutant tray are formed integrally into one piece; a plurality of pollutant trays can be connected together in series so as to have the water passage formed into a long and straight passage; there are no additional water pipes to be required and furnished under the pollutant tray so as to simplify the assembling operation of the pollutant trays.

Still another object of the present invention is to provide a pollutant tray, in which both sides of the water passage are provided with a plurality of water channels, of which each includes three different sloping surfaces, concentrating towards the water-intake hole that is in communication with the water passage. When a water pump sucks the water in the water passage, such suction force will suck the decomposed waste substance fallen into the water channels and the water passage.

A further object of the present invention is to provide a pollutant tray, in which the water-intake hole is in communication with the water passage, and the water channels include an upper water-intake hole and a lower water intake hole; the upper water-intake hole is located above the water channels so as to collect the decomposed waste substance in the water channels, while the lower water-intake hole is in communication with the space under the pollutant tray so as to facilitate the clean water under the pollutant tray to circulate properly.

A still further object of the present invention is to provide a pollutant tray, in which the top surface of the water passage is furnished with two symmetrical sloping surfaces; the water shed of each water channel is also furnished with symmetrical sloping surfaces so as to facilitate the decomposed waste substance to flow smoothly and to fall into the water channel directly and smoothly.

Yet another object of the present invention is to provide a pollutant tray, in which both ends of the water passage are furnished with two water pipe connectors respectively; inside the water pipe connector, there is a removable lamina. After a pipe is connected with pipe connector, the water in the aquarium and the decomposed waste substance can be pumped out.

DETAILED DESCRIPTION OF THE PREFERRED EMBODIMENT

Figure 1:
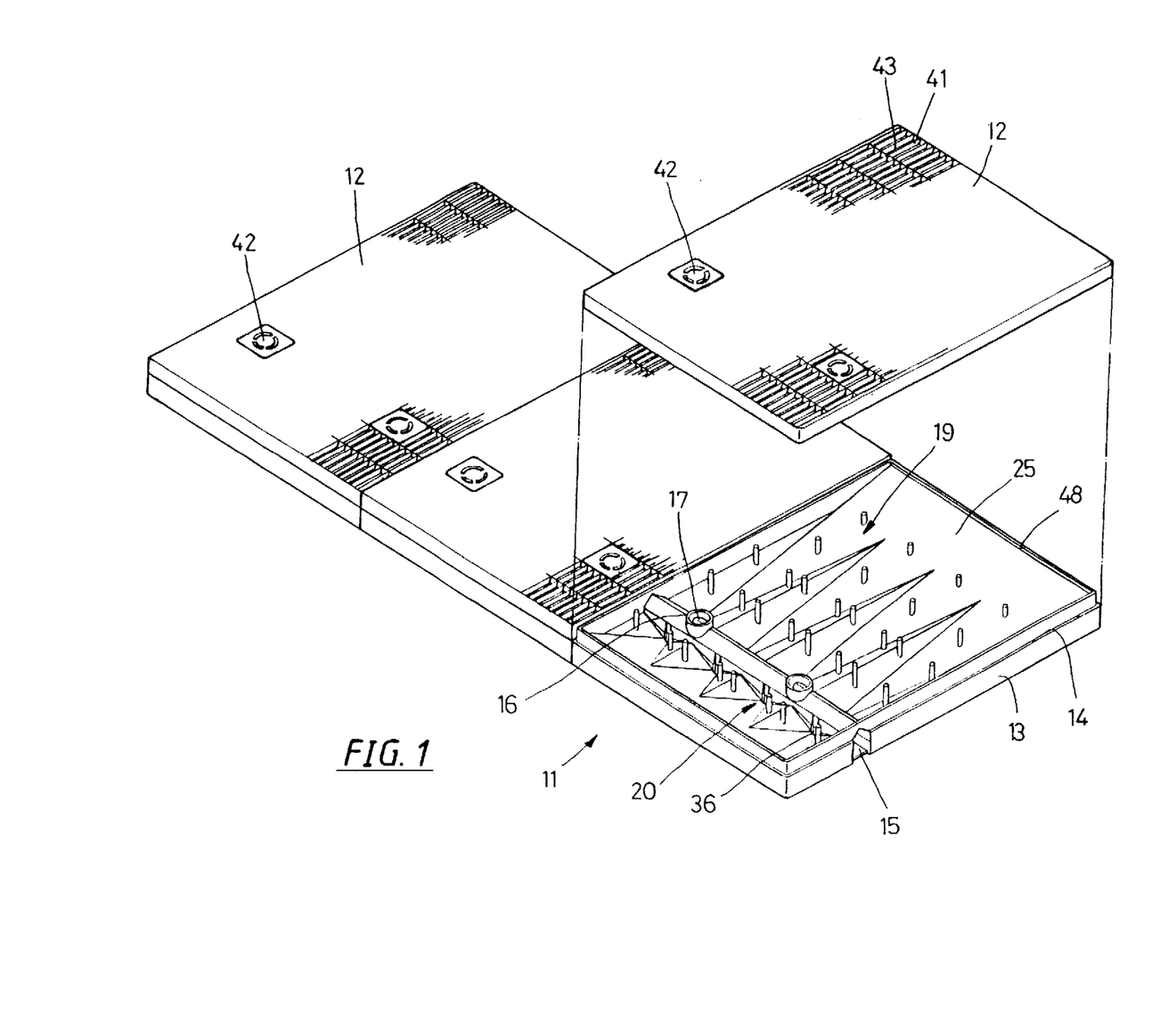
FIG. 1 is a perspective view of an embodiment according to the present invention, showing a plurality of pollutant trays assembled together and the relation to the filter cover.

This invention relates to an improved pollutant tray for aquarium; as shown in FIG. 1, each set of pollutant tray comprises a pollutant tray 11 and a filter cover 12, whereby a larger sized pollutant tray can be formed. The filter cover 12 is furnished with a plurality of filter meshes 43, of which each has a taper-shaped sloping surface 41 so as to facilitate waste substance to flow into the pollutant tray smoothly. The filter cover 12 is furnished with a removable lamina 42, which is opposite and over the water pipe connector 16 in the pollutant tray 11 so as to provide a round hole, and to facilitate the water pipe passing through the round hole to connect with the water pipe connector 16 above the water passage 15; then, the waste substance in the water channels 19 and 20 can be pumped out.

Figure 2:
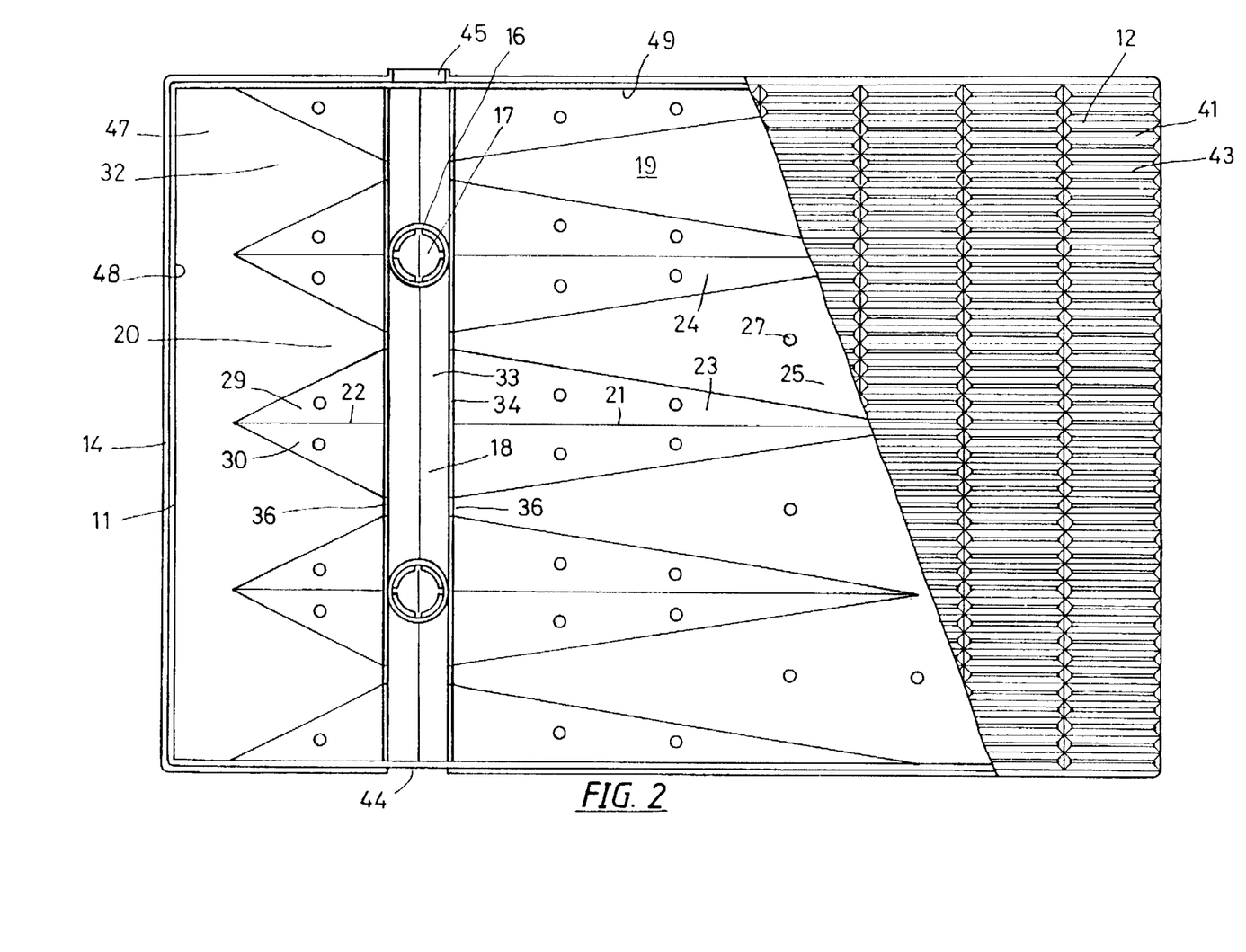
FIG. 2 is a plane view of the present invention.
Figure 3:
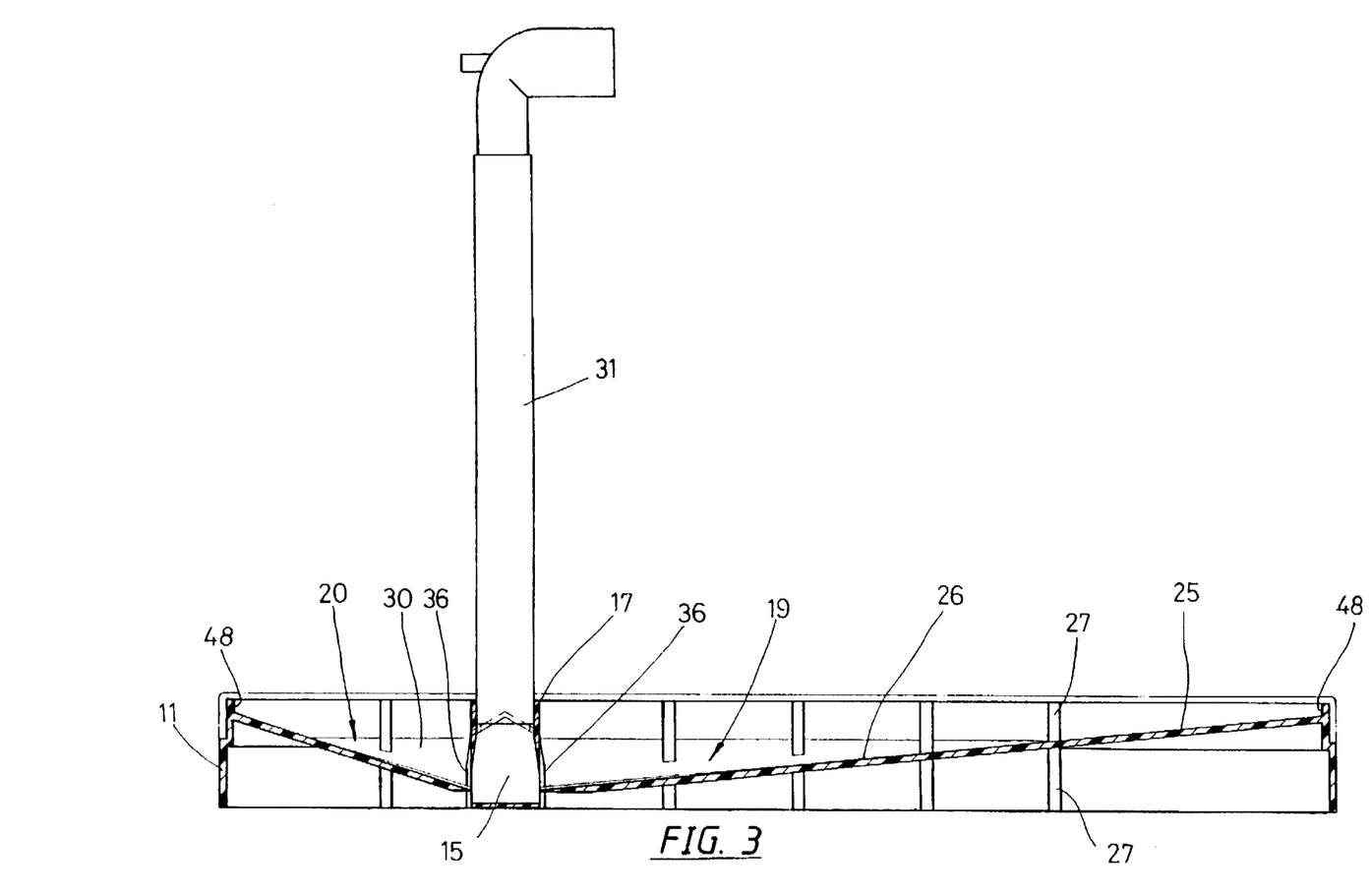
FIG. 3 is a sectional view of the present invention, showing the water passage connected with a water-pumping pipe.

As shown in FIGS. 1 to 4, the pollutant tray 11 is substantially a rectangular member, having a given thickness; the lower edge of the outer wall 13 of the pollutant tray 11 can be a flat surface or a corrugated bottom edge 46 so as to facilitate the decomposed waste substance dropped outside the pollutant tray 11 to be pumped into an outer filtering unit by means of water circulation under the pollutant tray 11. The top side of the outer wall 13 has a shoulder edge 14, which is to be mated with the outer lip of the filter cover 12 so as to form into a flat and neat surface. As shown in FIGS. 1 and 3, the water pipe connectors 16 above the water passage 15 are all aligned with the removable lamina 42 of the filter cover 12 respectively; as soon as the removable lamina 42 of the filter cover 12 is broken through, the removable lamina 17 of the water pipe connector 16 will be broken through immediately. One end of the water pipe 31 is plugged in and connected with the water pipe connector 16, while other end thereof is connected with the water inlet (not shown) of a water pump, or connected with a L-shaped pipe. The water in the water passage 15 can circulate by means of a water pump (for a large aquarium), or by using an air pump and a pipe connected with the L-shaped pipe so as to direct the water to circulate (for a small aquarium); then, the waste substance dropped into the water channel of the pollutant tray 11 can be pumped out and filtered.

As shown in FIGS. 1 to 6, the lateral part of the pollutant tray 11 is furnished with a water passage 15, of which both ends are provided with an indented part 44 and a plug flange 45 respectively (as shown in FIG. 2); the indented part 44 is used to mate with a plug flange 45 of a next pollutant tray 11 whenever a plurality pollutant trays 11 are connected laterally. When a plurality of pollutant trays 11 are connected together, the water passages 15 thereof will be connected into a straight passage; both ends of the straight passage may be closed with two end plugs respectively. One end of the water pipe 31 is to be plugged into the water pipe connector 16 after the removable lamina 17 being broken so as to let the water pump force water to flow into the filter unit. The pollutant trays 11 can be assembled together easily and quickly without using any pipes. Both sides of the water passage 15 are furnished with water channels 19 and 20 respectively; one side of the water passage 15 is provided with a short water channel 20 within the inner wall 48, while the opposite side of the water passage 15 is provided with a long water channel 19 within the inner wall 48. The purpose of furnishing the short water channel 20 is to provide a short distance between the water pipe connector 16 and the water pipe 31 of the water pump. The top surface 18 of the water passage 15 includes a first sloping surface 33, a second sloping surface 34 and a vertical surface 35; the first sloping surface 33 is on the highest part of the top surface 18; two first sloping surfaces 33 form into a ridge so as to prevent waste substance from accumulating. The first sloping surface 33 is connected with the second sloping surface 34 and the vertical surface 35 continuously. The sloping surfaces and the vertical surface 35 are specially furnished for the water-intake holes 36 of the water channels 19 and 20 respectively; such surfaces and the pollutant tray 11 are formed into one piece integrally so as to have the water passage 15 and the water channels 19 and 20 become in communication with each other.

Figure 4:
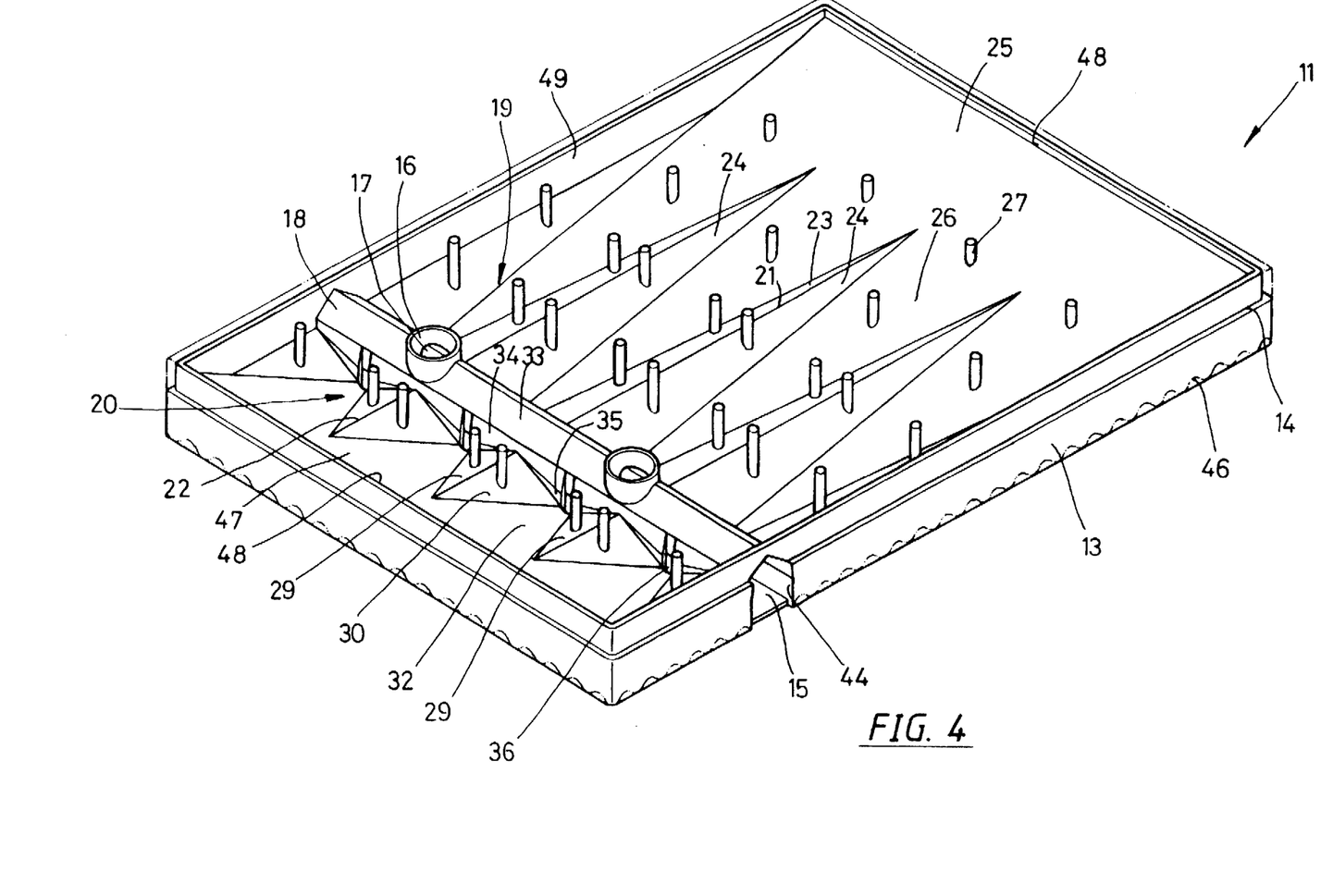
FIG. 4 is a perspective view of the present invention, showing the structure of the pollutant tray.
Figure 5:
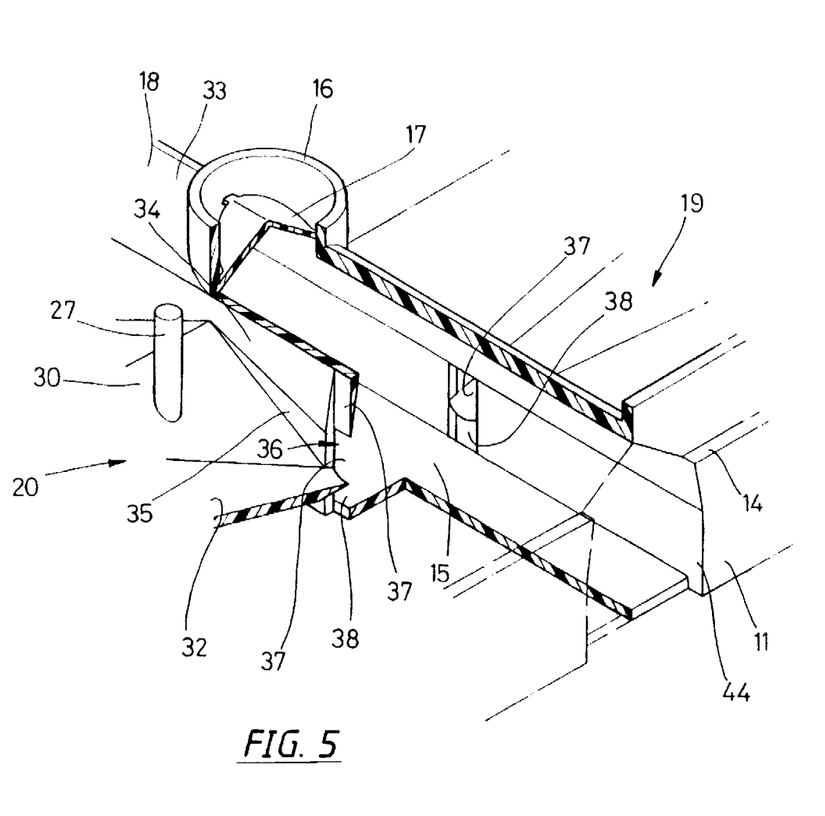
FIG. 5 is a fragmental section view of the present invention, showing the structural relation between the water passage and the water channel.
Figure 6:
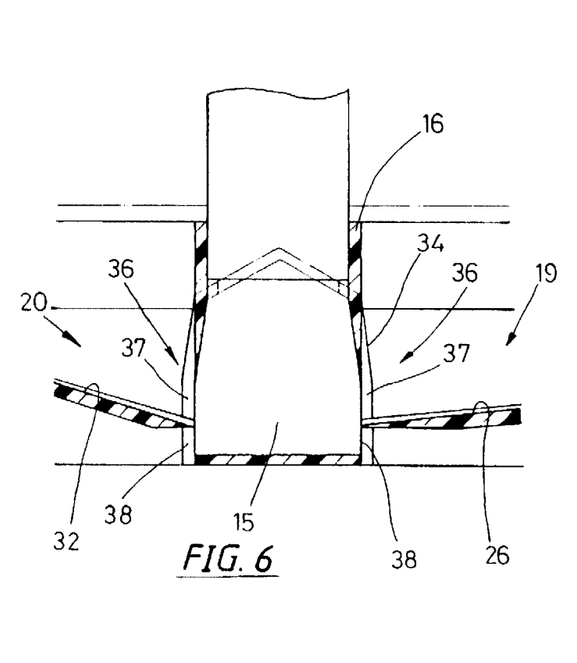
FIG. 6 is another fragmental section view of the present invention, showing the structural relation between the water passage and the water channel.

As shown in FIGS. 4 to 6, both sides of the water passage 15 are provided with a plurality of water channels 19 and 20. The water channel 19 has a longer space to the inner wall 48, while the water channel 20 has a shorter space to another inner wall 48. Each water channel 20 includes three sloping surfaces 29, 30 and 32; the two sloping surfaces 29 and 30 extend from the water-intake hole 36 and along the vertical surface 35; the long sloping surfaces extend towards the inner wall 48. The sloping surfaces 29 and 30 nearing the side wall 49 extend from the water-intake hole 36 and along the vertical surface 35 at a height similar to that of the side wall 49. The two sloping surfaces 29 and 30 between two water channels 20 form into a ridge-shaped water shed 22, which extends outwards from the vertical surface 35. The ends of the sloping surfaces 29 and 30 will be connected with the sloping surface 32, which has a lower point at the water-intake hole 36, and extends towards the inner wall 48 in an up-hill sloping manner, i.e., to form into a long sloping surface. The connected point between the sloping surface 32 and the inner wall is higher than that of the water shed 22 formed with the two sloping surfaces 29 and 30 so as to form into a co-sloping surface 47 by means of the sloping surfaces 32 of the water channels 20.

The other side of the water passage 15 has a plurality of longer water channels 19, of which each includes three sloping surfaces 23, 24 and 26. The two sloping surfaces 23 and 24 extend outwards from the water-intake hole 36 of the water passage 15, and the two sloping surfaces have a longer joint line between them toward the inner wall 48. The sloping surface 26 extends from the water-intake hole 36 toward the inner wall 48 in an up-hill manner. The two sloping surfaces 23 and 24 between two water channels 19 are connected together to form into a water shed 21; all the sloping surfaces 26 higher than the water shed 21 form into a co-sloping surface 25.

As shown in FIGS. 5 and 6, both sides of the water passage 15 are provided with a plurality of water channels 19 and 20, of which each includes three sloping surfaces concentrated to a water-intake hole 36, which is in communication with the water passage 15; each water-intake hole 36 includes an upper water-intake hole 37 and a lower water-intake hole 38; the upper water-intake hole 37 is located above the sloping surface 26 for collecting the decomposed waste substance fallen on the water channels 19 and 20. The lower water-intake hole 38 is used for pumping the water under the pollutant tray 11 so as to have the water circulated properly.

In order to have the water-intake hole 36 between the water passage 15 and the water channels 19 and 20 form integrally into one piece of pollutant tray 11, the water passage 15 extends downwards from the first sloping surface 33 to be in contact tangentially with the inner wall of the water passage 15 so as to form into an upper water-intake hole 37; the extension of the water passage 15 will reach to the upper space of the sloping surfaces 26 and 32 of the water channels 19 and 20. Under the sloping surfaces 26 and 32, the water-intake hole 38 having the same structure as that the upper water-intake hole 37; however, the lower water-intake hole 38 is used for water circulation only, and it has a lower height.

The upper and lower water-intake holes 37 and 38 are so formed that the first sloping extends downwards to be in contact tangentially with the inner wall of the water passage 15; then, the second sloping surface and the vertical surface are used to form into the remaining wall portion between the water channels 19 and 20 and the water passage 15. The upper and lower water-intake holes 37 and 38 are formed into shape with an upper and lower molds respectively. The sloping surfaces 26 and 32 of the water channels 19 and 20 extend from two inner walls 48 respectively to the tangential portion of the inner wall of the water passage 15. Any decomposed waste substance dropped in the water channels 19 and 20 will directly and smoothly flow into the water passage 15 as a result of water circulation, and then will be pumped into the external filtering unit.

Figure 7:
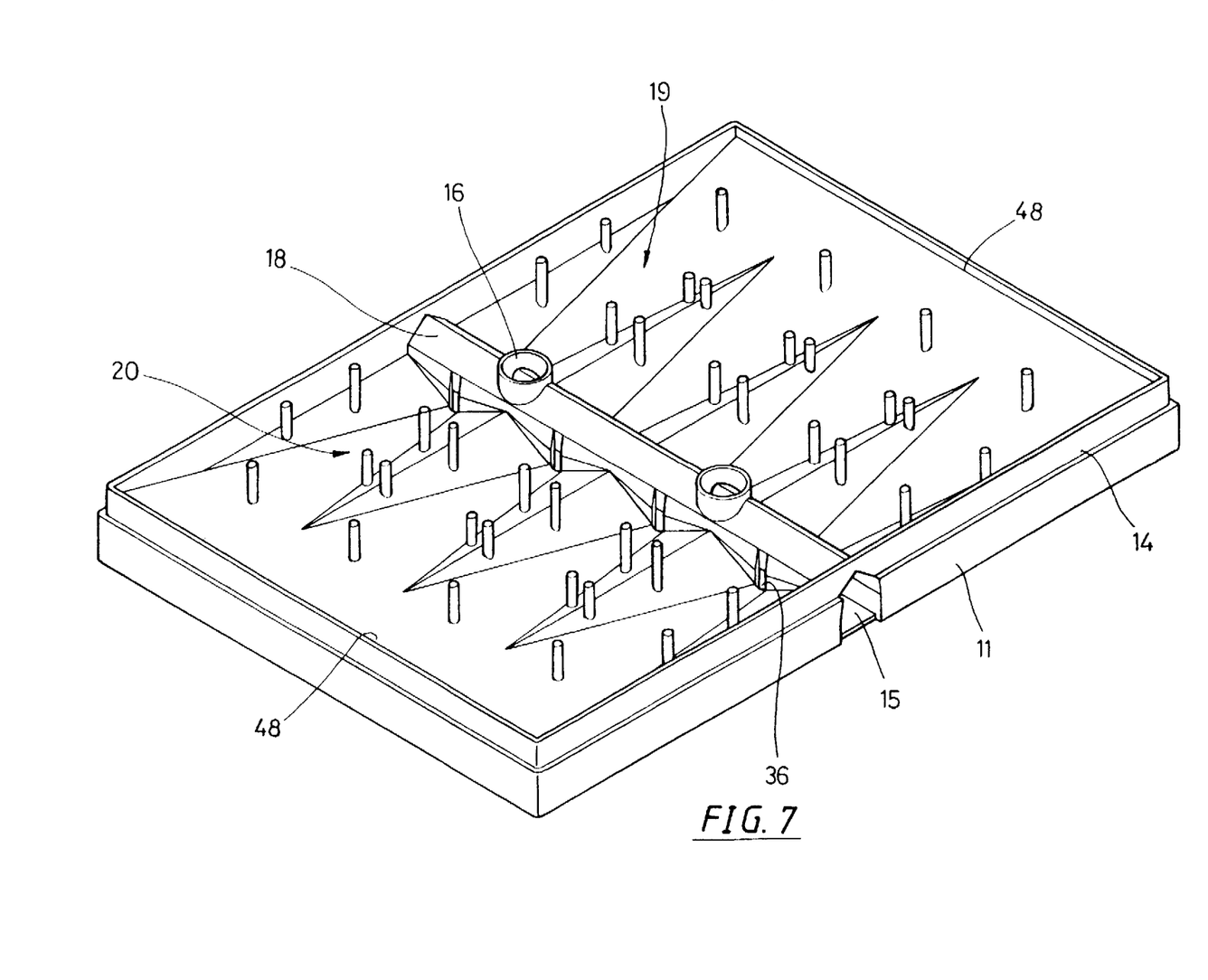
FIG. 7 is a perspective view of the a second embodiment of the present invention.
Figure 8:
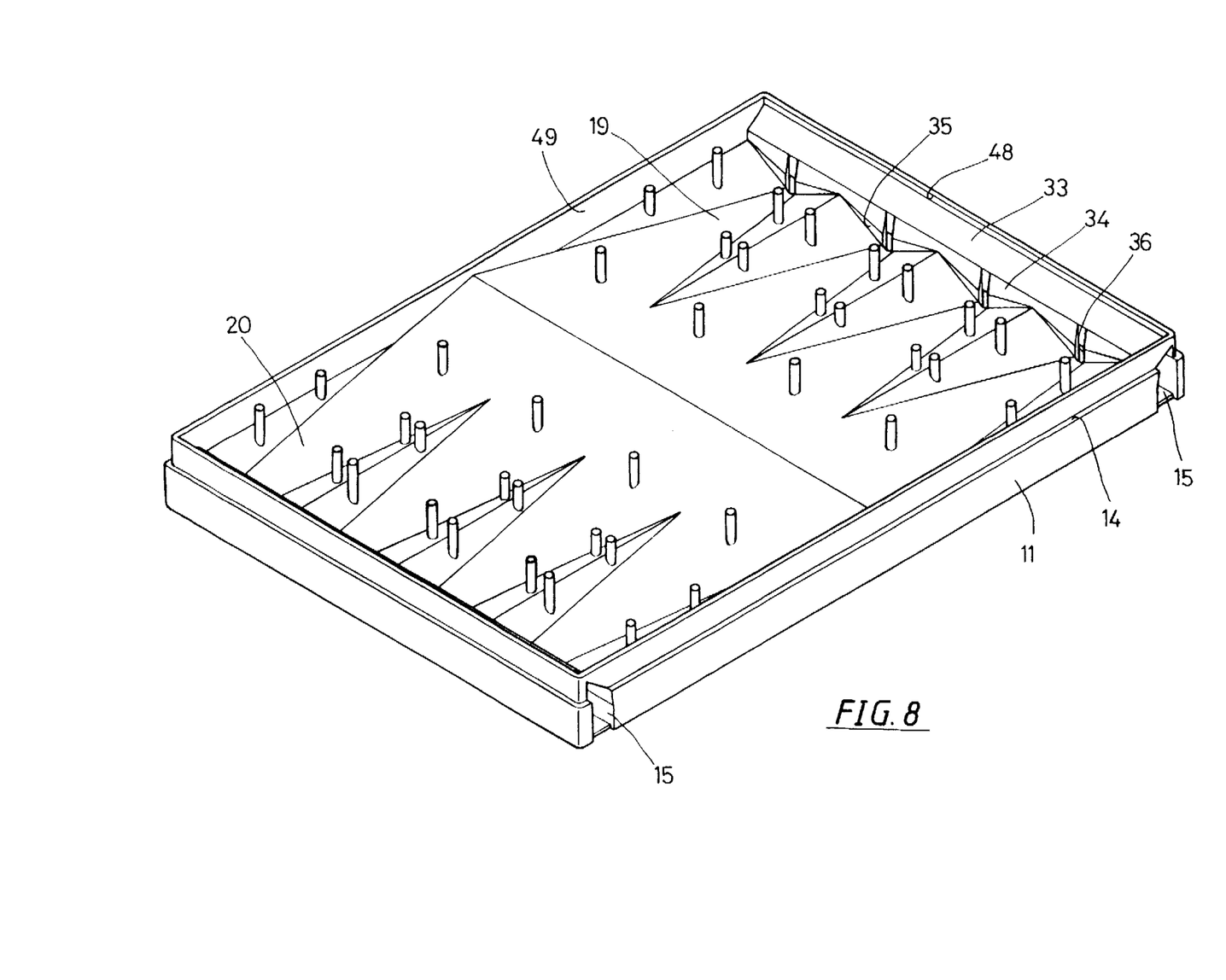
FIG. 8 is a perspective view of a third embodiment of the present invention.

As shown in FIG. 4, both sides of the water passage 15 are provided with a short water channel 20 and a long water channel 19; the short water channel 20 is located inside the aquarium near the inner wall so as to speed up the pumping operation. As shown in FIG. 7, both sides of the water passage 15 are furnished with two equal length water channels 19 and 20 respectively; the water-intake hole 36 of the water passage 15 is located near the center of the pollutant tray 11 so as to provide a better pumping. As shown in FIG. 8, the two water channels 19 and 20 have a common water shed in the center of the pollutant tray 11; the lower edges of the two inner walls 48 are furnished with two water passages 15 respectively; the two water passages 15 are connected together with a common pipe, or connected with separate pipes respectively so as to have water pumped into the outer filtering unit.

The outer wall 13 of the pollutant tray 11 is furnished with a shoulder edge 14 for mounting a filter cover 12 having filter meshes 43, of which each has a taper-shaped sloping 41. The filtering gravel on the filter cover 12 are supported by means of symmetrical supporting posts 27. The waste substance in the aquarium will be decomposed with the filtering gravel on the filter cover 12 before falling down to the water channels 19 and 20, and then will be washed away through the water passage 15 and flow into the outer filtering unit.

Through the aforesaid description to the embodiments, the features and structure of the present invention have been disclosed completely. Apparently, the present invention has disclosed an evident improvement to the prior art, which is never anticipated and achieved by any person in terms of the novel structure of the kind in the past.

I claim:

1. A pollutant tray for an aquarium comprising:

a) an outer wall having opposite ends interconnected by opposite lateral sides;

b) an interior wall forming a water passage extending between the opposite lateral sides, the interior wall having at least one sloping upper surface to prevent waste substance from accumulating thereon, the interior wall having a plurality of water intake holes communicating with the water passage on at least one side thereof; and, c) a water channel in communication with each of the plurality of water intake holes, each water channel having a lower surface sloping downwardly toward the associated water intake holes and opposite lateral sides sloping downwardly toward the lower surface.

2. The pollutant tray of claim 1 wherein the interior wall bounds opposite sides of the water passageway and comprises a plurality of water intake holes on each side of the water passageway.

3. The pollutant tray of claim 2 wherein the water channels communicating with the plurality of water intake holes on one side of the water passageway are substantially equal in length to the water channels communicating with the plurality of water intake holes on the opposite side of the water passageway.

4. The pollutant tray of claim 2 wherein the water channels communicating with the plurality of water intake holes on one side of the water passageway are different in length from the water channels communicating with the plurality of water intake holes on the opposite side of the water passageway.

5. The pollutant tray of claim 2 further comprising a water pipe connector on the interior wall.

6. The pollutant tray of claim 5 further comprising a removable lamina located in the water pipe connector such that removal of the lamina enables the water pipe connector to communicate with the water passageway.

7. The pollutant tray of claim 1 further comprising a shoulder edge formed on a top of the outer wall to facilitate mounting a filter cover thereon.

8. The pollutant tray of claim 1 further comprising a plurality of supporting posts to support a filter cover mounted on the pollutant tray.

9. The pollutant tray of claim 1 wherein the outer wall comprises a substantially flat lower edge.

10. The pollutant tray of claim 1 wherein the outer wall comprises a corrugated lower edge.

11. The pollutant tray of claim 1 wherein the lower surfaces of the water channels divide each water intake hole into an upper water intake hole and a lower water intake hole.

* * * * *